United States Patent Office 2,871,266
Patented Jan. 27, 1959

2,871,266

TERT-CARBINAMINES

Gerard C. Riley, Philadelphia, Pa., assignor to Rohm & Haas Company, Philadelphia, Pa., a corporation of Delaware No Drawing. Application January 7, 1957
Serial No. 632,648

11 Claims. (Cl. 260—584)

This invention deals with novel tert-carbinamines of a unique chemical configuration. It further concerns a method for the preparation of these novel compounds. It also deals with specific compositions containing these novel compounds.

The compounds of this invention may be represented by the formula

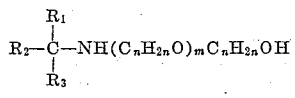

in which $R_1$, $R_2$, and $R_3$ are alkyl groups whose total carbon atom content ranges from 7 to 23, $n$ is an integer of two to three, and $m$ is an integer of 5 to 100. These compounds are prepared by an exact two-step reaction between a tert-carbinamine, having the formula

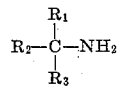

and ethylene or propylene oxide, or both, in a manner to be fully discussed hereinafter. The resultant product is a polyalkoxyamine characterized by an unexpected monolinear chain of alkoxy groups and concurrent unpredictable properties.

It has been suggested in the prior art that primary amines can be reacted with alkylene oxides, such as ethylene or propylene oxide, in the presence of a strongly acidic or strongly basic catalyst to produce compounds containing from a few to many oxyalkylene units distributed in a dilinear manner. That is, both of the hydrogen atoms attached to the nitrogen atoms of the primary amine are responsive to the addition of oxyalkylene groups to form dilinear chains, of various amounts of oxyalkylene groups, emanating from the amino nitrogen atom. The present tert-carbinamine reactants were reacted, according to the known methods, with ethylene oxide in the presence of a strongly acidic catalyst. When one equivalent of ethylene oxide had reacted at one of the amino hydrogen atoms, the reaction ceased. The product was a simple hydroxyethylated amine. The present tert-carbinamine reactants were also reacted with ethylene oxide in the presence of an alkali, according to the known methods. Ethylene oxide seemed to react initially but the tert-carbinamine reactants were nearly substantially recovered from the reaction mixture. There were formed only small amounts of polyethylene glycols and waxy products of low nitrogen content and indefinite structure. By following the teachings of the prior art, in either an acidic or basic medium, there are not produced the valuable products of this invention. Nor are there produced any of the expected compounds having dilinear chains of oxyalkylene groups. Therefore, it is apparent that a novel method is required to produce the unique compounds of this invention.

In order to produce the compounds of this invention, one must rigidly adhere to the directions set forth hereinafter. In order to form polyoxyalkylated derivatives of tert-carbinylamines it is necessary to form first an N-hydroxyethyl derivative thereof and then react this derivative with ethylene or propylene oxide in the presence of an alkaline catalyst. In order to produce the desired compounds in high yield, an intermediate step is needed in order to neutralize the acid catalyst. This may be accomplished by the addition of an alkali metal hydroxide or an alkaline earth metal hydroxide, or the equivalent thereof. It is then necessary to strip the reaction mixture of water to avoid formation of polyethylene glycols under the influence of an alkaline catalyst. It is also best to remove the salt, sludge, or aqueous brine formed from neutralizing the acid catalyst.

As a catalyst for the first step of the present reaction, there may be used any strong acid, such as hydrochloric, hydrobromic, sulfuric, an arylsulfonic such as benzenesulfonic, an alkanesulfonic such as butanesulfonic, hydriodic, nitric, phosphoric, or polyphosphoric acid. The hydrogen form of sulfonated cation-exchange resins may also be used. The amount of acid catalyst may range from one to one hundred mole percent based on the tert-carbinamine. It is preferred that 10 to 30 mole percent of acid catalyst be used.

The reaction of the tert-carbinamine with the ethylene or propylene oxide is effected most conveniently by mixing the acid catalyst and the tert-carbinamine alone or with an inert organic solvent such as a naphtha, benzene, or toluene. The temperature employed may be between 20° and 180° C. and is preferably 60° to 95° C., particularly when hydrochloric acid is used as the catalyst. Ethylene or propylene oxide is then passed into the mixture. Usually pressure is not necessary, but may be used if desired. The first mole of ethylene oxide is added to the tert-carbinamine without difficulty. In the case of the $C_8$ or $C_9$ amines, a second hydroxyethyl may be added, but the second mole of ethylene or propylene oxide is added less readily, particularly as the size of the hydrocarbon residue increases, until at about $C_{14}$ to $C_{16}$ only one mole of the alkylene oxide can be added in the presence of an acid catalyst under any conditions. In any case, only one hydrogen atom attached to the amino nitrogen is reactive as repeated hydroxyl determinations indicate.

When about the first mole of ethylene or propylene oxide has been added, or with lower tert-carbinamines one or two moles, the acid catalyst is neutralized by adding a base. Sodium hydroxide, sodium carbonate, potassium hydroxide, potassium carbonate, or calcium hydroxide have proved satisfactory for this purpose. When an aqueous acid has been used as first stage catalyst, a concentrated aqueous alkali solution may be used and the resulting brine drawn off. Under other conditions a sludge or salt may be formed, which is desirably separated as by filtering. The reaction mixture should then be stripped of any remaining water, by any conventional means such as by heating under reduced pressure. This avoids the formations of polyethylene glycols in the subsequent stage of the present reaction.

The next stage of the reaction is conducted by adding from about 0.5 to 5 mole percent of an alkaline catalyst and running ethylene or propylene oxide into the alkaline reaction mixture until the desired hydrophobic-hydrophilic balance is obtained in the resulting products. As alkaline catalyst there may be used an alkali metal hydroxide, such as sodium or potassium hydroxide. It is also possible to use an alkali metal itself, such as sodium, or an alkali metal alcoholate, such as sodium methoxide, potassium ethoxide, or sodium butoxide. The reaction may be performed at ordinary pressures or at elevated pressures. Usually a pressure from about 10 to 20 p. s. i. provides a rapid rate of reaction with temperatures between 100° and 200° C. The preferred range of temperature is 130° to 170° C.

While ethylene oxide is the usual reactant, there may also be used mixtures of ethylene oxide and propylene oxide, or even propylene oxide itself with due allowance for shifts in the hydrophobic-hydrophilic balance.

As tert-carbinamines there may be used any of the N-tertiary alkyl amines having a total of eight to twenty-four carbon atoms. There are now on the market a variety of such amines. Some are composed primarily of a single entity; others are a mixture of isomers, homologues, or both. Typically, there are available a tert-octyl primary amine, 2-amino-2,4,4-trimethylpentane, and a tert-tridecyl primary amine, iso $$C_8H_{17}(C_2H_5)_2CNH_2$$

There are also available mixtures of tert-alkyl primary amines, such as $C_{12}H_{25}NH_2$ to $C_{15}H_{31}NH_2$ and $C_{18}H_{37}NH_2$ to $C_{24}H_{49}NH_2$, these being derived from hydrocarbon fractions of such sizes. These tert-carbinamines may be summarized by the formula $$R_2-\underset{\underset{R_3}{|}}{\overset{\overset{R_1}{|}}{C}}-NH_2$$

in which $R_1$, $R_2$, and $R_3$ have the significance previously set forth. The smallest tert-carbinamine reactant is an octylamine and the largest, a tetracosylamine, as will be apparent to one skilled in the art.

The preparation of the polyoxyalkylated tert-alkyl-amines may be more fully understood from the following illustrative examples, wherein parts by weight are used throughout.

*Example 1*

(a) There were mixed in a reaction vessel equipped with stirrer, thermometer, and inlet tube 286 parts of a technical tert-octadecylamine, which comprised chiefly $C_{18}$ amines with some higher tert-alkyl primary amines, and 28.6 parts of aqueous 35% hydrochloric acid. The mixture was stirred and heated to about 90° C., whereupon ethylene oxide was introduced through the inlet tube. The temperature was held at 90° to 94° C. and the pressure at one to five pounds gauge until 44 parts of ethylene oxide had been added. The water was then taken off under reduced pressure and about 200 parts of aqueous 5% sodium hydroxide solution added. The water layer was taken off and a second 200 part portion of aqueous 5% sodium hydroxide added and then separated. The washed oil was stripped under low pressure and filtered to give 330 parts of a clear red oil. This had a neutral equivalent of 326, thus corresponding essentially to N-hydroxyethyl-tert-octadecylamine, the theoretical neutral equivalent being 330.

(b) A portion of 99 parts of this oil was treated with 0.3 part of potassium hydroxide. There was added thereto over a period of four hours 132 parts of ethylene oxide with the temperature held at 160° to 170° C. at one to five pounds pressure (gauge). The reaction mixture was treated with 1.3 parts of aqueous 20% sulfuric acid, stripped, and filtered.

The final product was a clear red oil which was soluble in water to give surface active solutions and which corresponded in composition to $$\text{tert-}C_{18}H_{37}NH(CH_2CH_2O)_{10}CH_2CH_2OH$$

*Example 2*

(a) A technical mixture of tert-carbinylamines from $C_{18}$ to $C_{24}$ having a neutral equivalent of 360 was reacted as in Example 1(a) with a molar proportion of ethylene oxide. There was thereby formed an N-hydroxyethyl-tert-carbinylamine having a neutral equivalent of 405, a density at 50° C. of 0.865, and a congealing temperature of −15° C.

(b) Portions of this product were taken and reacted with various proportions of ethylene oxide to give tert-carbinylaminopolyethoxyethanols. Reaction in the proportion of one mole of N-hydroxyethyl-tert-carbinylamine to five moles of ethylene oxide gave a product having on average five ethoxy groups, having a density of 0.938 at 50° C. and a congealing temperature of 0° C., and being scarcely soluble in water, but soluble in such organic solvents as benzene. The solutions in organic solvents took up water.

The product formed from a proportion of one mole of hydroxyethylamine to ten moles of ethylene oxide had a composition $$C_nH_{2n+1}NH(CH_2CH_2O)_{10}CH_2CH_2OH$$

had a density of 0.970 at 50° and a congealing point of 6° C., and was spontaneously emulsifiable in water.

The product formed from a proportion of hydroxyethylamine to oxide of 1:15 corresponded in composition to $C_nH_{2n+1}NH(CH_2CH_2O)_{15}CH_2CH_2OH$, had a density of 1.005 at 50° and a congealing point of 8° C., and was soluble in water up to 62° C.

The product formed from a proportion of hydroxyethylamine to oxide from 1:20 corresponded in composition to $C_nH_{2n+1}NH(CH_2CH_2O)_{20}CH_2CH_2OH$, had a density of 1.020 at 50° C. and a congealing point of 12° C., and was soluble in water up to 94° C.

The product formed from a proportion of hydroxyethylamine to oxide of 1:50 corresponded in composition to $C_nH_{2n+1}NH(CH_2CH_2O)_{50}CH_2CH_2OH$, had a density of 1.05 at 50° C., and a congealing point of 45° C., and gave clear solutions even up to 100° C.

In the same way larger proportions of ethylene or propylene oxide may be added to give water-soluble products which have surface activity, but which have a predominant hydrophilic portion. While compounds with 5 to 50 alkoxy groups are preferred, the total number may extend to 100.

*Example 3*

(a) Ethylene oxide was passed at 80° C. into a mixture of 200 parts of a tert-carbinylamine containing chiefly a tert-dodecyl group together with some higher alkyl groups up to tert-pentadecyl, 20 parts of aqueous 35% hydrochloric acid, and 15 parts of water. After three hours, 32 parts of ethylene oxide had been reacted. The reaction mixture was washed with aqueous 15% sodium hydroxide solution and with 250 parts of water. The reaction mixture was then distilled. After unreacted amines had been taken off, a main fraction of 139 parts of N-hydroxyethyl-tert-carbinylamine was obtained at 157° to 169° C./15 mm. The residue amounted to 14 parts.

(b) The main fraction, having a neutral equivalent of 235, was treated with three mole percent of sodium hydroxide and with ethylene oxide in a mole ratio of 10:1, oxide to amine. The product gave clear solutions in water which were highly surface active, giving rapid wetting out, and having effective emulsifying action.

*Example 4*

(a) In the same way tert-nonylamine (derived from propylenetrimer) was treated with 0.1 mole percent of aqueous 20% sulfuric acid solution and then with propylene oxide at 90° to 100° C. One mole of this oxide was taken up per mole of amine. The reaction product was treated with a little aqueous 50% caustic solution, separated, and stripped free of water to give a product corresponding in composition to $$\text{tert-}C_9H_{19}NHC_3H_6OH$$

(b) This material was treated with five mole percent of potassium hydroxide and ethylene oxide was added thereto at 150° to 160° C. until 10 moles of ethylene oxide had been taken up per mole of amine. The resulting product was water-soluble and its solutions were surface active, having low surface and interfacial tensions.

In place of ethylene oxide, a mixture of ethylene and propylene oxides was used to supply about 20 alkoxy groups. The product was a water-soluble surface active polyoxyalkylated amine.

In the same way, a portion of the tert-nonylamine was reacted with one mole of ethylene oxide, acid catalyst was neutralized, water was removed, and the hydroxyethyl product was reacted with ethylene oxide to form useful, surface active products of the structure $$\text{tert-}C_9H_{19}NH(CH_2CH_2O)_mCH_2CH_2OH$$

$m$ being an integer from 5 to 50.

In like manner, there was prepared a series of compounds having the formula $$\text{tert-}C_8H_{17}NH(CH_2CH_2O)_mCH_2CH_2OH$$

$m$ being an integer in the range of 5 to 80.

The polyoxyalkylated tert-carbinamine products of this invention are usually dark in color, frequently red to brown, liquids to waxy or pasty solids. Repeated careful analyses, particularly hydroxyl numbers, reveal that only a single hydrogen atom of the tert-carbinamine reactants is responsive to the present reaction. The products, therefore, contain only a monolinear chain of alkoxy groups. This is a surprising result in view of the prior art.

These unique products are valuable bactericides particularly against *Micrococcus pyogenes* var. *aureus* and *Salmonella typhosa* even when used in dilute concentrations. These products are also excellent in inhibiting corrosion of metallic parts, such as steel, from acidic constituents, such as aqueous hydrochloric and sulfuric acids when these acids are present in amounts up to 10% by weight and above, even at relatively high temperatures (175° F. and above) and for prolonged periods of time (several hours). The products of this invention are singularly suited to oil-well applications in which about 10 to 100 parts or more per million of a subject product or mixture of products is added to a water system for flooding a new oil well. The present products are effective against the appreciable amounts of bacteria normally present in such systems and permit the smooth and efficient functioning of the oil-well flooding operation. Otherwise, the bacteria normally abundantly present in such systems cause the formation of solid metabolic materials which plug a great many of the openings in the strata of the oil well and, accordingly, appreciably decrease the output of the well and add considerable operational difficulties to the entire operation. Furthermore, the present products at the same time inhibit corrosion on the metal parts of the oil-well flooding equipment from acidic components normally present in such oil-well flooding systems. Also, since the products of this invention are excellent wetting and penetrating agents, their use in oil-well flooding systems tends to maximize the oil output realized. Therefore, because of this surprisingly beneficial concomitance of properties, the present compounds are valuable in oil-well flooding operations in situations where two or more of the known compounds would otherwise have to be employed. In such circumstances, the present compounds may be employed as is or in the form of their simple salts, such as acetate, propionate, and the like.

The compounds of this invention are also valuable as low-foam, hard surface detergent bactericides. That is, these products are efficient detergents on glass, plastic, furniture steel, nylon, and others, both as to cleansing efficiency and prevention of dirt redeposition. At the same time, they are bactericidal and exhibit relatively low foam which latter characteristic as become increasingly important with the increased use of automatic residential and commercial washing equipment. Here again, there is use for the present products where two or more of the known compounds would otherwise be employed.

The polyoxyalkylated tert-carbinamine are also useful in automobile cooling systems as combined detergents and corrosion inhibitors.

This is a continuation-in-part of application Serial No. 371,194, filed July 29, 1953, now abandoned.

I claim:

1. A composition of matter having the formula $$R_2-\underset{\underset{R_3}{|}}{\overset{\overset{R_1}{|}}{C}}-NH(C_nH_{2n}O)_mC_nH_{2n}OH$$

in which $R_1$, $R_2$, and $R_3$ are alkyl groups having a total of 7 to 23 carbon atoms, $n$ is an integer of 2 to 3, and $m$ is an integer of 5 to 100.

2. A composition of matter having the formula $$R_2-\underset{\underset{R_3}{|}}{\overset{\overset{R_1}{|}}{C}}-NH(CH_2CH_2O)_mCH_2CH_2OH$$

in which $R_1$, $R_2$, and $R_3$ are alkyl groups having a total of 7 to 23 carbon atoms and $m$ is an integer of 5 to 100.

3. A composition of matter having the formula $$\text{tert-}C_8H_{17}NH(CH_2CH_2O)_mCH_2CH_2OH$$

in which $m$ is an integer of 5 to 80 and said tert-$C_8H_{17}$ has a tertiary carbon atom attached directly to the amino nitrogen atom.

4. A composition of matter having the formula $$\text{tert-}C_9H_{19}NH(CH_2CH_2O)_mCH_2CH_2OH$$

in which $m$ is an integer of 5 to 50 and said tert-$C_9H_{19}$ has a tertiary carbon atom attached directly to the amino nitrogen atom.

5. An aqueous oil-well flooding composition comprising a compound having the formula $$R_2-\underset{\underset{R_3}{|}}{\overset{\overset{R_1}{|}}{C}}-NH(C_nH_{2n}O)_mC_nH_{2n}OH$$

in which $R_1$, $R_2$, and $R_3$ are alkyl groups having a total of 7 to 23 carbon atoms, $n$ is an integer of 2 to 3, and $m$ is an integer of 5 to 100.

6. An aqueous bactericidal detergent composition comprising a compound having the formula $$R_2-\underset{\underset{R_3}{|}}{\overset{\overset{R_1}{|}}{C}}-NH(C_nH_{2n}O)_mC_nH_{2n}OH$$

in which $R_1$, $R_2$, and $R_3$ are alkyl groups having a total of 7 to 23 carbon atoms, $n$ is an integer of 2 to 3, and $m$ is an integer of 5 to 100.

7. A process for the preparation of a compound having the formula $$R_2-\underset{\underset{R_3}{|}}{\overset{\overset{R_1}{|}}{C}}-NH(C_nH_{2n}O)_mC_nH_{2n}OH$$

in which $R_1$, $R_2$, and $R_3$ are alkyl groups having a total of 7 to 23 carbon atoms, $n$ is an integer of 2 to 3, and $m$ is an integer of 5 to 100, which comprises reacting a tert-carbinamine having the formula $$R_2-\underset{\underset{R_3}{|}}{\overset{\overset{R_1}{|}}{C}}-NH_2$$

with an alkylene oxide of two to three carbon atoms in the presence of from one to one hundred mole percent of a strong acid catalyst and at a temperature of about 20° to 180° C. to form an N-hydroxyalkyl-tert-carbinamine, neutralizing said acid catalyst and removing any water present, and reacting said N-hydroxyalkyl-tertcarbinamine with an alkylene oxide of two to three carbon atoms in the presence of from 0.5 to 5 mole percent of an alkaline catalyst and at a temperature of about 100° to 200° C.

8. A process for the preparation of a compound having the formula

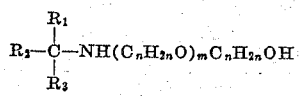

in which $R_1$, $R_2$, and $R_3$ are alkyl groups having a total of 7 to 23 carbon atoms, $n$ is an integer of 2 to 3, and $m$ is an integer of 5 to 100, which comprises reacting a tert-carbinamine having the formula

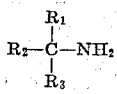

with an alkylene oxide of two to three carbon atoms in the presence of from ten to thirty mole percent of a strong acid catalyst and at a temperature of about 60° to 95° C. to form an N-hydroxyalkyl-tert-carbinamine, neutralizing said acid catalyst and removing any water present, and reacting said N-hydroxyalkyl-tert-carbinamine with an alkylene oxide of two to three carbon atoms in the presence of from 0.5 to 5 mole percent of a strong inorganic base catalyst and at a temperature of about 130° to 170° C.

9. A process for the preparation of a compound having the formula

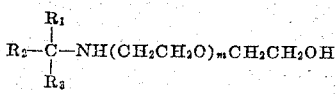

in which $R_1$, $R_2$, and $R_3$ are alkyl groups having a total of 7 to 23 carbon atoms and $m$ is an integer of 5 to 100, which comprises reacting a tert-carbinamine having the formula

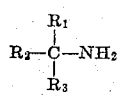

with ethylene oxide in the presence of from ten to thirty mole percent of a strong acid catalyst and at a temperature of about 60° to 95° C. to form an N-hydroxyethyl-tert-carbinamine, neutralizing said acid catalyst and removing any water present, and reacting said N-hydroxyethyl-tert-carbinamine with ethylene oxide in the presence of from 0.5 to 5 mole percent of a strong inorganic base catalyst and at a temperature of about 130° to 170° C.

10. A process for the preparation of a compound having the formula

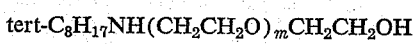

in which $m$ is an integer of 5 to 80 and said tert-$C_8H_{17}$ has a tertiary carbon atom attached directly to the amino nitrogen atom, which comprises reacting a tert-octylamine having a tertiary carbon atom attached directly to the nitrogen atom with ethylene oxide in the presence of from one to one hundred mole percent of a strong acid catalyst and at a temperature of about 20° to 180° C. to form an N-hydroxyethyl-tert-carbinamine, neutralizing said acid catalyst and removing any water present, and reacting said N-hydroxyethyl-tert-carbinamine with ethylene oxide in the presence of from 0.5 to 5 mole percent of an alkaline catalyst and at a temperature of about 100° to 200° C.

11. A process for the preparation of a compound having the formula

in which $m$ is an integer of 5 to 50 and said tert-$C_9H_{19}$ has a tertiary carbon atom attached directly to the amino nitrogen atom which comprises reacting a tert-nonylamine having a tertiary carbon atom attached directly to the nitrogen atom with ethylene oxide in the presence of from one to one hundred mole percent of a strong acid catalyst and at a temperature of about 20° to 180° C. to form an N-hydroxyethyl-tert-carbinamine, neutralizing said acid catalyst and removing any water present, and reacting said N-hydroxyethyl-tert-carbinamine with ethylene oxide in the presence of from 0.5 to 5 mole percent of an alkaline catalyst and at a temperature of about 100° to 200° C.

References Cited in the file of this patent

UNITED STATES PATENTS

| | | |
|---|---|---|
| 1,970,578 | Schoeller et al. | Aug. 21, 1934 |
| 2,131,142 | Orthner et al. | Sept. 27, 1938 |
| 2,174,762 | Schuette et al. | Oct. 3, 1939 |
| 2,226,119 | De Groote et al. | Dec. 24, 1940 |
| 2,255,082 | Orthner et al. | Sept. 9, 1941 |